United States Patent
Wagle et al.

(10) Patent No.: US 10,351,755 B2
(45) Date of Patent: Jul. 16, 2019

(54) LOSS CIRCULATION MATERIAL COMPOSITION HAVING ALKALINE NANOPARTICLE BASED DISPERSION AND WATER INSOLUBLE HYDROLYSABLE POLYESTER

(71) Applicant: Saudi Arabian Oil Company, Dhahran (SA)

(72) Inventors: Vikrant Wagle, Abqaiq (SA); Rajendra Kalgaonkar, Abqaiq (SA); Abdullah Al-Yami, Dhahran (SA); Zainab Alsaihati, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/679,884

(22) Filed: Aug. 17, 2017

(65) Prior Publication Data

US 2019/0055455 A1    Feb. 21, 2019

(51) Int. Cl.

| | |
|---|---|
| *C09K 8/508* | (2006.01) |
| *C08G 63/08* | (2006.01) |
| *C01B 33/141* | (2006.01) |
| *C01F 11/18* | (2006.01) |
| *C01B 32/20* | (2017.01) |
| *C04B 28/24* | (2006.01) |
| *C04B 28/26* | (2006.01) |
| *C09K 8/504* | (2006.01) |
| *C09K 8/506* | (2006.01) |
| *C09K 8/516* | (2006.01) |
| *C09K 8/03* | (2006.01) |

(52) U.S. Cl.
CPC ............ *C09K 8/5086* (2013.01); *C01B 32/20* (2017.08); *C01B 33/1417* (2013.01); *C01F 11/18* (2013.01); *C04B 28/24* (2013.01); *C04B 28/26* (2013.01); *C08G 63/08* (2013.01); *C09K 8/506* (2013.01); *C09K 8/5045* (2013.01); *C09K 8/516* (2013.01); *C09K 8/032* (2013.01); *C09K 2208/08* (2013.01); *C09K 2208/10* (2013.01)

(58) Field of Classification Search
None
See application file for complete search history.

(56) References Cited

U.S. PATENT DOCUMENTS

| | | |
|---|---|---|
| 5,320,171 A | 6/1994 | Laramay |
| 7,013,973 B2 | 3/2006 | Danican et al. |
| 7,458,424 B2 | 12/2008 | Odeh et al. |
| 7,934,557 B2 | 5/2011 | Nguyen |
| 7,954,549 B2 | 6/2011 | Lende et al. |

(Continued)

FOREIGN PATENT DOCUMENTS

| | | |
|---|---|---|
| WO | 2015041703 A1 | 3/2015 |
| WO | 2015116044 A1 | 8/2015 |

OTHER PUBLICATIONS

International Search Report and Written Opinion for related PCT application PCT/US2018/046830 dated Nov. 14, 2018; pp. 1-13.

*Primary Examiner* — Jeffrey D Washville
(74) *Attorney, Agent, or Firm* — Bracewell LLP; Constance G. Rhebergen; Brian H. Tompkins

(57) ABSTRACT

A lost circulation material (LCM) is provided having an alkaline nanosilica dispersion and a polyester activator. The alkaline nanosilica dispersion and the polyester activator may form a gelled solid after interaction over a contact period. Methods of lost circulation control using the LCM are also provided.

11 Claims, 2 Drawing Sheets

(56) References Cited

U.S. PATENT DOCUMENTS

| | | |
|---|---|---|
| 8,765,646 B2 | 7/2014 | Panga et al. |
| 9,040,468 B2 | 5/2015 | Loiseau et al. |
| 9,045,965 B2 | 6/2015 | Patil et al. |
| 9,133,386 B2 | 9/2015 | Kumar et al. |
| 9,388,335 B2 | 7/2016 | Loiseau et al. |
| 9,523,268 B2 | 12/2016 | Potapenko et al. |
| 9,587,477 B2 | 3/2017 | Lafferty et al. |
| 9,631,468 B2 | 4/2017 | Miller |
| 2010/0016183 A1 | 1/2010 | Roddy et al. |
| 2011/0094746 A1 | 4/2011 | Allison et al. |
| 2013/0292120 A1 | 11/2013 | Patil et al. |
| 2014/0158354 A1 | 6/2014 | Kumar et al. |
| 2014/0174739 A1 | 6/2014 | Bourcier et al. |
| 2015/0075797 A1 | 3/2015 | Jiang et al. |
| 2015/0275644 A1 | 10/2015 | Chen et al. |
| 2015/0344772 A1 | 12/2015 | Droger et al. |
| 2015/0369028 A1 | 12/2015 | Potapenko et al. |
| 2015/0369029 A1* | 12/2015 | Potapenko ............ E21B 43/267 166/280.2 |
| 2016/0040518 A1 | 2/2016 | Potapenko et al. |
| 2016/0122625 A1 | 5/2016 | Singh et al. |
| 2016/0319185 A1 | 11/2016 | Semenov et al. |
| 2016/0319188 A1 | 11/2016 | Loiseau et al. |

\* cited by examiner

LOSS CIRCULATION MATERIAL COMPOSITION HAVING ALKALINE NANOPARTICLE BASED DISPERSION AND WATER INSOLUBLE HYDROLYSABLE POLYESTER

BACKGROUND

Field of the Disclosure

The present disclosure generally relates to controlling lost circulation in a well during drilling with a drilling fluid. More specifically, embodiments of the disclosure relate to lost circulation materials (LCMs).

Description of the Related Art

Various challenges are encountered during drilling and production operations of oil and gas wells. For example, fluids used in drilling, completion, or servicing of a wellbore can be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. The extent of fluid losses to the formation may range from minor losses (for example less than 10 barrels/hour ((bbl/hr), also referred to as seepage loss, to severe (for example, greater than 100 bbl/hr), or higher, also referred to referred to as complete fluid loss. As a result, the service provided by such fluid is more difficult or costly to achieve.

Such lost circulation can be encountered during any stage of operations and occurs when drilling fluid (or drilling mud) pumped into a well returns partially or does not return to the surface. While de minimis fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. In extreme cases, lost circulation problems may force abandonment of a well.

SUMMARY

Lost circulation materials (LCMs) are used to mitigate lost circulation by blocking the path of the drilling mud into the formation. The type of LCM used in a lost circulation situation depends on the extent of lost circulation and the type of formation. Existing LCMs may perform poorly in mitigation and prevention of moderate lost circulation and seepage type lost circulation, and may not be suitable for controlling severe loss of circulation. Costs incurred in loss circulation situations may be due to losses of drilling fluids, losses of production, and the costs of LCMs.

In one embodiment, a method to control lost circulation in a lost circulation zone in a wellbore is provided. The method includes introducing a lost circulation material (LCM) into the wellbore such that the LCM contacts the lost circulation zone and reduces a rate of lost circulation into the lost circulation zone as compared to a period before introducing the LCM. The LCM includes an alkaline nanosilica dispersion and a water insoluble polyester. In some embodiments, wherein the LCM consists of the alkaline nanosilica dispersion and the water insoluble polyester. In some embodiments, the water insoluble polyester includes at least one of a polylactide, a polyhydroxyalkanoate, polyglycolide, polylactoglycolide, and polycaprolactone. In some embodiments, the water insoluble polyester is in an amount in the range of 0.1 percent by volume of the total volume (v/v %) to 10 v/v %. In some embodiments, the method includes maintaining the alkaline nanosilica dispersion and water insoluble polyester in contact with the lost circulation zone for a contact period, such that the alkaline nanosilica dispersion forms a gelled solid. In some embodiments, the contact period is a range of 0.5 hours to 24 hours. In some embodiments, the lost circulation zone has a temperature that is at least 100° F. In some embodiments, the method includes mixing the alkaline nanosilica dispersion and the water insoluble polyester to form the LCM at the surface before introducing the LCM into the wellbore. In some embodiments, the LCM includes at least one of calcium carbonate particles, fibers, mica, and graphite. In some embodiments, the fibers include at least one of polyester fibers, polypropylene fibers, starch fibers, polyketone fibers, ceramic fibers, glass fibers and nylon fibers.

In one embodiment, a lost circulation material (LCM) composition includes an alkaline nanosilica dispersion and a water insoluble polyester, the water insoluble polyester selected to form a gelled solid with the alkaline nanosilica dispersion after a period. In some embodiments, the period is a range of 0.5 hours to 24 hours. In some embodiments, the water insoluble polyester includes at least one of a polylactide, a polyhydroxyalkanoate, polyglycolide, polylactoglycolide, and polycaprolactone. In some embodiments, the water insoluble polyester includes an amount in the range of 0.1 percent by volume of the total volume (v/v %) to 10 v/v %.

In another embodiment, a solid gelled material useful for mitigating lost circulation is provided. The solid gelled material forms by introducing an alkaline nanosilica dispersion and a water insoluble polyester to a lost circulation zone. The nanosilica dispersion includes amorphous silicon dioxide and water, such that the nanosilica dispersion and the water insoluble polyester contact the lost circulation zone for a period such that the solid gelled material forms. In some embodiments, the water insoluble polyester includes at least one of a polylactide, a polyhydroxyalkanoate, polyglycolide, polylactoglycolide, and polycaprolactone. In some embodiments, the water insoluble polyester includes an amount in the range of 0.1 percent by volume of the total volume (v/v %) to 10 v/v %. In some embodiments, the water insoluble polyester is introduced separately from the alkaline nanosilica dispersion to the lost circulation zone. In some embodiments, the water insoluble polyester and the alkaline nanosilica dispersion are introduced simultaneously to the lost circulation zone.

DETAILED DESCRIPTION

Figure 1:
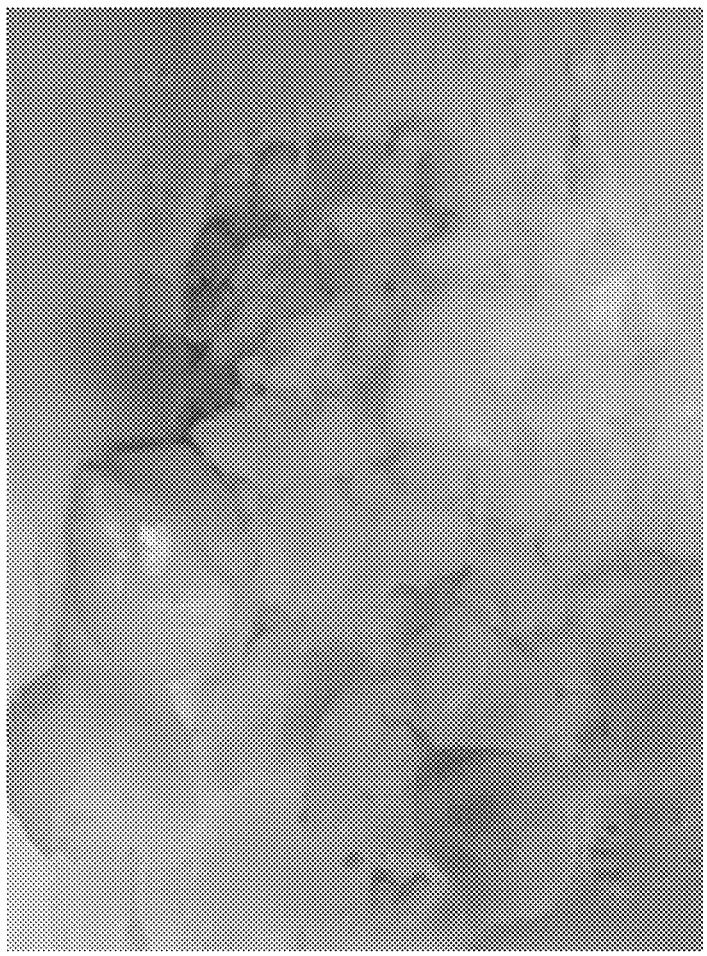
FIG. 1 is a photograph of the solid formed by a mixture of an alkaline nanosilica dispersion with s polylactide activator.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a lost circulation material (LCM) that includes an alkaline nanosilica dispersion and a water insoluble hydrolysable polyester activator. The LCM may mitigate or prevent lost circulation in a well, as well as provide seepage control and minimize or prevent fluid loss. In some embodiments, the polyester activator may be polylactide. In other embodiments, the polyester activator may include polyhydroxyalkanoates, polyglycolide, polylactoglycolide, and polycaprolactone. The alkaline nanosilica dispersion may have a pH of at least 8, such as in the range of about 8.5 to about 10.5 before interaction with the polyester activator. The alkaline nanosilica dispersion and polyester activator LCM may be introduced into a lost circulation zone in a wellbore, such that the alkaline nanosilica dispersion and polyester activator LCM alters the lost circulation zone. The alkaline nanosilica dispersion and polyester activator LCM may be allowed to interact with the lost circulation zone for a time period to enable the in-situ formation of a gelled solid as a result of the interaction between the alkaline nanosilica dispersion and an acid generated from the polyester activator via hydrolysis.

Alkaline Nanosilica Dispersion and Polyester Activator LCM

In some embodiments, an LCM includes an alkaline nanosilica dispersion and a water insoluble hydrolysable polyester activator. The alkaline nanosilica dispersion may include amorphous silicon dioxide and an aqueous medium. For example, in some embodiments, the alkaline nanosilica dispersion may be formed using water or other suitable aqueous mediums (for example, water and glycerin). In some embodiments, the nanosilica dispersion has a pH of about 8.5 to about 10.5 at 25° C. before interaction with the polyester activator. In some embodiments, the nanosilica dispersion has a pH of at least 8 before interaction with the activator. In some embodiments, the nanosilica dispersion has a specific gravity of 1.2 (g/ml). In some embodiments, the nanosilica dispersion may be obtained from Evonik Corporation of Parsippany, N.J., USA.

In some embodiments, the water insoluble hydrolysable polyester activator may include polylactide. In other embodiments, the polyester activator may include other water insoluble hydrolysable polyesters, such as polyhydroxyalkanoates, polyglycolide, polylactoglycolide, and polycaprolactone. In some embodiments, the weight ratio of the alkaline nanosilica dispersion to the polyester activator is in the range of 50:1 to 80:1. For example, in some embodiments, the weight ratio of the alkaline nanosilica dispersion to the polyester activator is 66:1. In some embodiments, the polyester activator may be in an amount in the range of about 0.1 percent by volume of the total volume (v/v %) to about 10 v/v %

In some embodiments, the nanosilica dispersion and polyester activator LCM may include additional materials. For example, in some embodiment the nanosilica dispersion and polyester activator LCM may include calcium carbonate particles, fibers (for example, polyester fibers, polypropylene fibers, starch fibers, polyketone fibers, ceramic fibers, glass fibers nylon fibers, or combinations thereof), mica, graphite, or combinations thereof.

The alkaline nanosilica dispersion and polyester activator LCM may be introduced (for example, by pumping) into a lost circulation zone in a wellbore to control lost circulation. In some embodiments, the alkaline nanosilica dispersion and polyester activator LCM may be allowed to interact with the lost circulation zone for a contact period. The contact period may be of sufficient duration to enable formation of a solid as a result of the interaction between the alkaline nanosilica dispersion and the polyester activator. The formed solid may alter the lost circulation zone (for example, by entering and blocking porous and permeable paths, cracks, and fractures in a formation in the lost circulation zone, such as forming a structure in a mouth or within a fracture). In some embodiments, the polyester and the alkaline nanosilica dispersion may be introduced simultaneously to the lost circulation zone. In other embodiments, the polyester activator may be introduced separately from the alkaline nanosilica dispersion to the lost circulation zone.

In some embodiments, the contact period may be in the range of about 0.5 hours to about 24 hours. For example, in some embodiments the contact period may be about 16 hours. In some embodiments, the contact period may be selected based on the formation type of the lost circulation zone.

As shown infra, the alkaline nanosilica dispersion and polyester activator may form a solid LCM after a sufficient time period. In some embodiments, the gelling of the alkaline nanosilica dispersion may be controlled by varying the concentration of the polyester activator, and the gelling may be controlled by changing the pH of the LCM. For example, increasing concentrations of the polyester activator may increase the pH of the LCM and increase the rate of gelation of the LCM. Additionally, the polyester activator exhibits no precipitation with the alkaline nanosilica dispersion at elevated temperature, thus enabling use of the LCM composition as a single fluid pill (that is, without staged mixing of each component). Consequently, the delayed and controlled gelling of the alkaline nanosilica dispersion LCM may provide for easier pumping of the LCM. The alkaline nanosilica dispersion and polyester activator LCM may be used at elevated temperatures in a wellbore such as, for example, temperatures greater than 100° F., such as 300° F. In some embodiments, the alkaline nanosilica dispersion and polyester activator LCM may be used in lost circulation zones having temperatures below 100° F. In such embodiments, the LCM may include a catalyst to increase the rate of hydrolysis of the ester. In some embodiments, the catalyst may include hydrochloric acid, sulfuric acid, or other suitable acids. Moreover, the environmentally friendly properties of the alkaline nanosilica dispersion and polyester activator LCM may minimize or prevent any environmental impact and effect on ecosystems, habitats, population, crops, and plants at or surrounding the drilling site where the alkaline nanosilica dispersion and polyester activator LCM is used.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of an alkaline nanosilica dispersion was tested with a water insoluble hydrolysable polyester activator.

The alkaline nanosilica dispersion used was IDISIL® SI 4545 manufactured by Evonik Corporation of Parsippany, N.J., USA. The properties of the nanosilica dispersion are described in Table 1:

TABLE 1

Properties of Alkaline Nanosilica Dispersion

| Nanosilica dispersion | |
| --- | --- |
| pH @ 25° C. | 8.5-10.5 |
| Specific Gravity (grams/milliliter (g/ml)) | 1.2 |
| Viscosity @ 25° C. (cP) | <30 |
| Visual Appearance | White/Off White |
| Weight % SiO2 | 45 |

A composition was prepared using the alkaline nanosilica dispersion and polylactide. 100 milliliters (ml) of the alkaline nanosilica dispersion was added to an empty beaker. 2 grams (g) of polylactide (that is, 1 gram of polylactide per 66 grams of alkaline nanosilica dispersion) was added to the alkaline nanosilica dispersion and mixed using a stirrer. The alkaline nanosilica dispersion-polylactide mixture was subjected to static aging in an aging cell. The cell was static aged at a temperature of about 250° F. for about 16 hours to simulate downhole conditions.

Figure 2:
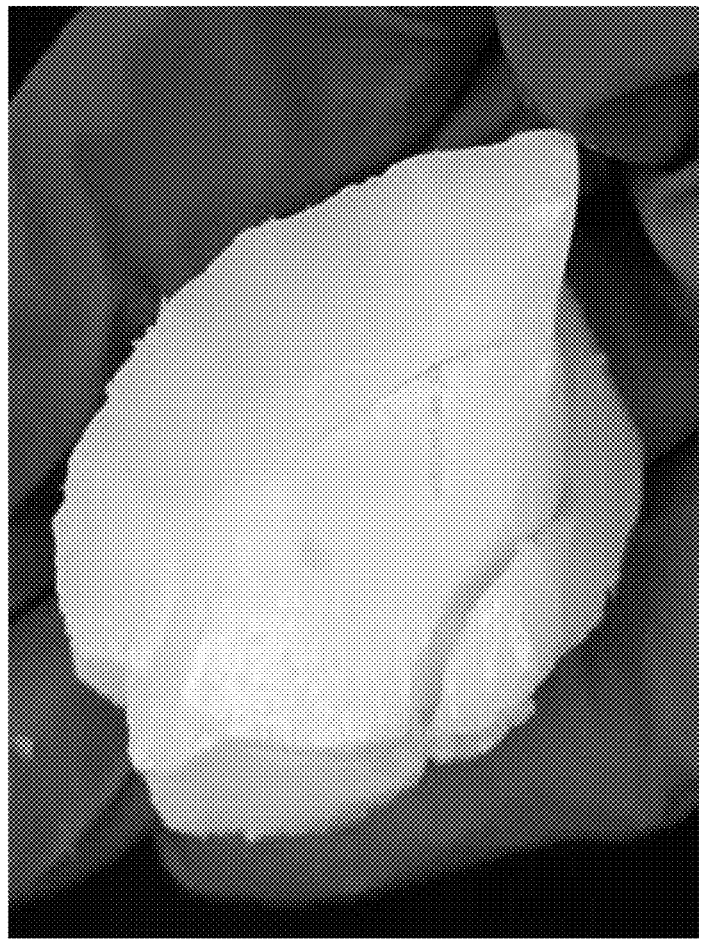
FIG. 2 is a photograph of the solid formed by a mixture of an alkaline nanosilica dispersion with s polylactide activator.

After 16 hours of static aging, the alkaline nanosilica dispersion was converted into a solid. The polylactide hydrolyzed in the aqueous medium (for example, water) of the alkaline nanosilica dispersion to generate a resulting acid. The acid acted as an activator that destabilized the alkaline nanosilica dispersion and produced a solid. FIGS. 1 and 2 are photographs 100 and 200 respectively of the solid formed by the mixture of the alkaline nanosilica dispersion with the polylactide activator. The formation of the solid after static aging at the elevated temperature of 250° F. shows that the alkaline nanosilica dispersion can behave as an LCM when introduced with a water insoluble hydrolysable polyester activator.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to control lost circulation in a lost circulation zone in a wellbore, comprising:
    introducing a lost circulation material (LCM) into the wellbore such that the LCM contacts the lost circulation zone and reduces a rate of lost circulation of a drilling fluid into the lost circulation zone as compared to a period before introducing the LCM, wherein the LCM comprises an alkaline nanosilica dispersion and a water insoluble polyester, wherein the weight ratio of the alkaline nanosilica dispersion to the polyester activator is in the range of 50:1 to 80:1.

2. The method of claim 1, wherein the LCM consists of the alkaline nanosilica dispersion and the water insoluble polyester.

3. The method of claim 1, wherein the water insoluble polyester comprises at least one of a polylactide, a polyhydroxyalkanoate, polyglycolide, polylactoglycolide, and polycaprolactone.

4. The method of claim 1, comprising maintaining the alkaline nanosilica dispersion and water insoluble polyester in contact with the lost circulation zone for a contact period, such that the alkaline nanosilica dispersion forms a gelled solid.

5. The method of claim 4, wherein the contact period comprises a range of 0.5 hours to 24 hours.

6. The method of claim 1, wherein the lost circulation zone has a temperature that is at least 100° F.

7. The method of claim 1, comprising mixing the alkaline nanosilica dispersion and the water insoluble polyester to form the LCM at the surface before introducing the LCM into the wellbore.

8. The method of claim 1, wherein the LCM comprises at least one of calcium carbonate particles, fibers, mica, and graphite.

9. The method of claim 8, wherein the fibers comprises at least one of polyester fibers, polypropylene fibers, starch fibers, polyketone fibers, ceramic fibers, glass fibers and nylon fibers.

10. The method of claim 1, wherein the LCM comprises a catalyst selected to increase an hydrolysis rate of the water insoluble polyester.

11. The method of claim 10, wherein the catalyst comprises hydrochloric acid or sulfuric acid.

* * * * *